US006997104B1

(12) United States Patent
Lin

(10) Patent No.: US 6,997,104 B1
(45) Date of Patent: Feb. 14, 2006

(54) COFFEE MAKER

(75) Inventor: Yu-Yuan Lin, Tainan (TW)

(73) Assignee: Uni-Splendor Corp., Tainan (TW)

( * ) Notice: Subject to any disclaimer, the term of this patent is extended or adjusted under 35 U.S.C. 154(b) by 0 days.

(21) Appl. No.: 10/907,762

(22) Filed: Apr. 14, 2005

(51) Int. Cl.
*A47J 31/10* (2006.01)

(52) U.S. Cl. ........................................ 99/323.3; 99/275

(58) Field of Classification Search .................. 99/483, 99/495, 323.3, 275, 279, 297, 287, 307, 310, 99/285, 314; 220/832, 912, 737, 758; 215/759, 215/769, 235, 396; 222/144.5, 475.1, 507, 222/518, 500, 571, 469, 468, 470–474, 465.1
See application file for complete search history.

(56) References Cited

U.S. PATENT DOCUMENTS 1,440,947 A * 1/1923 William ...................... 222/192
1,662,020 A * 3/1928 William ................. 222/189.07
3,696,733 A * 10/1972 Beverett ...................... 99/307
3,715,974 A * 2/1973 Beverett ...................... 99/285
3,974,758 A * 8/1976 Stone, Jr. ..................... 99/275
3,991,664 A * 11/1976 Yamato ....................... 99/310
4,251,004 A * 2/1981 Sun ........................... 220/4.01
4,398,454 A * 8/1983 Lambros et al. .............. 99/285
5,110,016 A * 5/1992 Heimann et al. ........ 222/475.1
D364,307 S * 11/1995 Chang ......................... D7/322
6,085,946 A * 7/2000 Hirsch et al. ............ 222/475.1
6,302,307 B1 * 10/2001 Hirsch et al. ............... 222/500
6,422,133 B1 * 7/2002 Brady ......................... 99/267
6,755,120 B1 6/2004 Lin ........................... 99/323.3

* cited by examiner

*Primary Examiner*—Timothy F. Simone
(74) *Attorney, Agent, or Firm*—Alan D. Kamrath; Nikolai & Mersereau, P.A.

(57) ABSTRACT

A coffee maker includes a liquid container. A handle assembly includes a seat placed on the container. A pan is placed in the seat. A spring-biased discharge control assembly and a check valve are mounted to the pan. A lid assembly is fitted on top of the seat. An elongate actuation assembly is hingedly connected to a rear of the lid assembly and includes a push button located intermediate the rear and a forward actuation member. Pressing the push button will lower the actuation member to press down the discharge control assembly and will form a gap for permitting coffee to flow out of the container by tilting the coffee maker. Releasing the push button will expand the spring to lift the discharge control assembly for closing the gap.

1 Claim, 4 Drawing Sheets

COFFEE MAKER

BACKGROUND OF THE INVENTION

1. Field of Invention

The present invention relates to coffee making equipment and, more particularly, to a coffee maker having its coffee discharge passageway opened or closed by simply pressing a push button or not.

2. Related Art

There have been numerous suggestions in prior patents for facilitating opening and closing of a coffee maker. For example, U.S. Pat. No. 6,755,120, entitled "Coffeepot" is characterized in that it comprises a body 1, a handle assembly 2, a lid connecting assembly 3, a discharge control assembly 4, a check valve 5, an abutment assembly 6, a push member 7, and a lid 8. For pouring coffee, the push member 7 is simply pressed to lower the discharge control assembly 4 a distance with the spring 44 being compressed. At that moment, a gap 37 is formed between the base 42 and the top of the lid connecting assembly 3. Thus, a coffee discharge passageway is formed. Coffee can be poured out of the spout 22 via the coffee discharge passageway by tilting the coffeepot.

A need remains for an improved coffee maker in order to contribute significantly to the advancement of the art.

SUMMARY OF THE INVENTION

It is therefore an object of the present invention to provide a coffee maker comprising a liquid container including an upper, first opening and an O-ring tightly fitted around the first opening. A handle assembly includes an annular seat placed on top of the container, a spout extended outward from a periphery of the annular seat, and a handle member, with the handle member having a recessed end formed with the seat. A pan is placed in the annular seat and includes a discharge opening at its bottom, a central second opening, and a cylindrical cavity between the second opening and its upwardly extending edge. A discharge control assembly includes a disk having a central, barbell shaped post and a spring on the post, with the spring biased between a top end of the post and the pan. A lid assembly is fitted on a top of the seat above the pan and includes a rear connecting member conformed to the recessed end, with the connecting member having a third opening. An elongate actuation assembly has its rear hingedly connected to a rear portion of the connecting member. The elongate actuation assembly includes a push button projected from the third opening and a forward actuation member above the top end of the post. A check valve is mounted in the cavity. Pressing the push button downward will lower the actuation member to press down the post and the disk, with the spring being compressed. Thus a gap is formed between the disk and a bottom of the pan to create a coffee discharge passageway from the gap to the spout through the discharge opening. Releasing the push button will expand the spring to lift the post and the disk for closing the gap and the coffee discharge passageway.

The above and other objects, features and advantages of the present invention will become apparent from the following detailed description taken with the accompanying drawings.

DETAILED DESCRIPTION OF THE INVENTION

Figure 1:
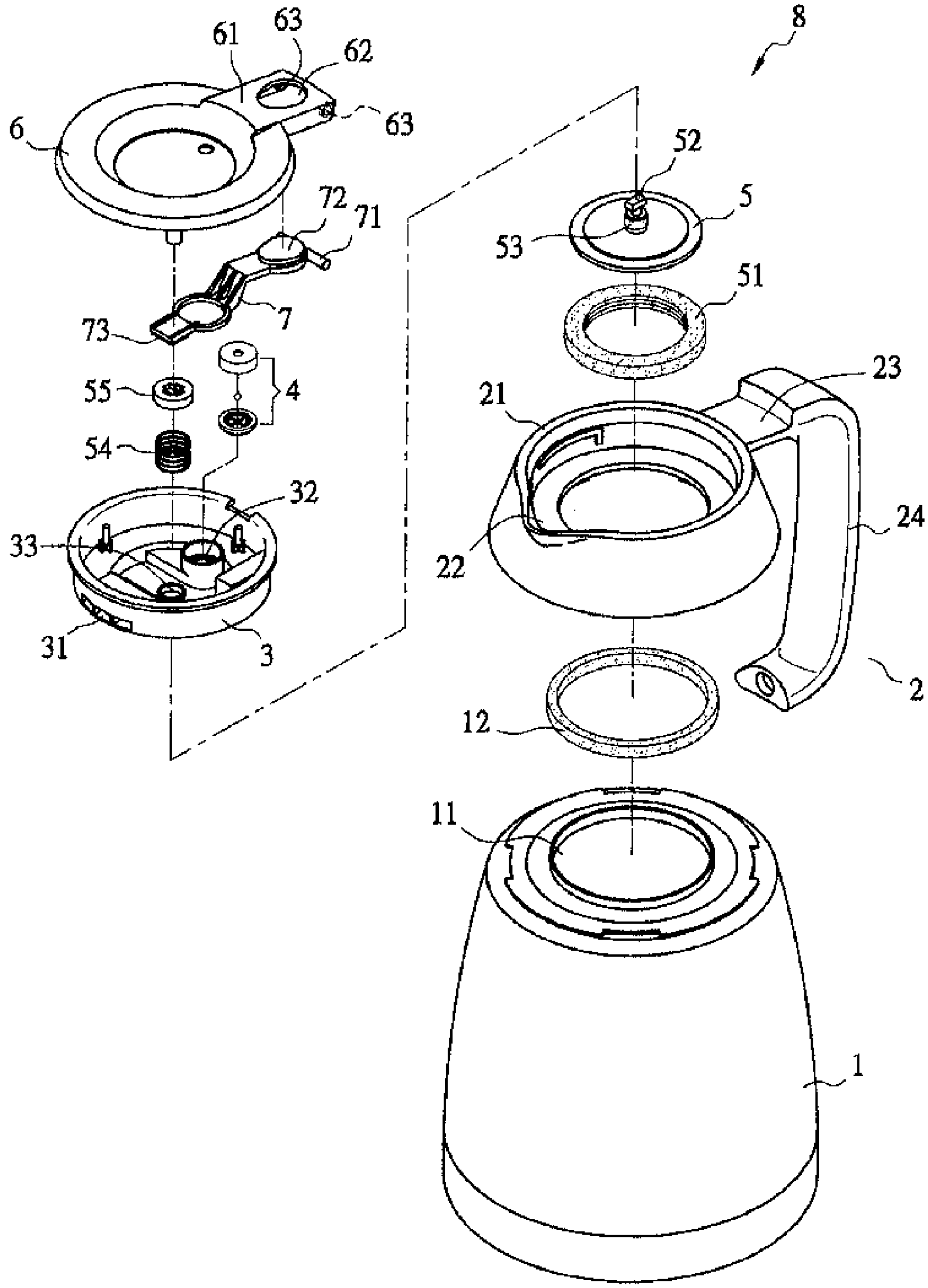
FIG. 1 is an exploded view of a preferred embodiment of a coffee maker according to the invention.
Figure 2:
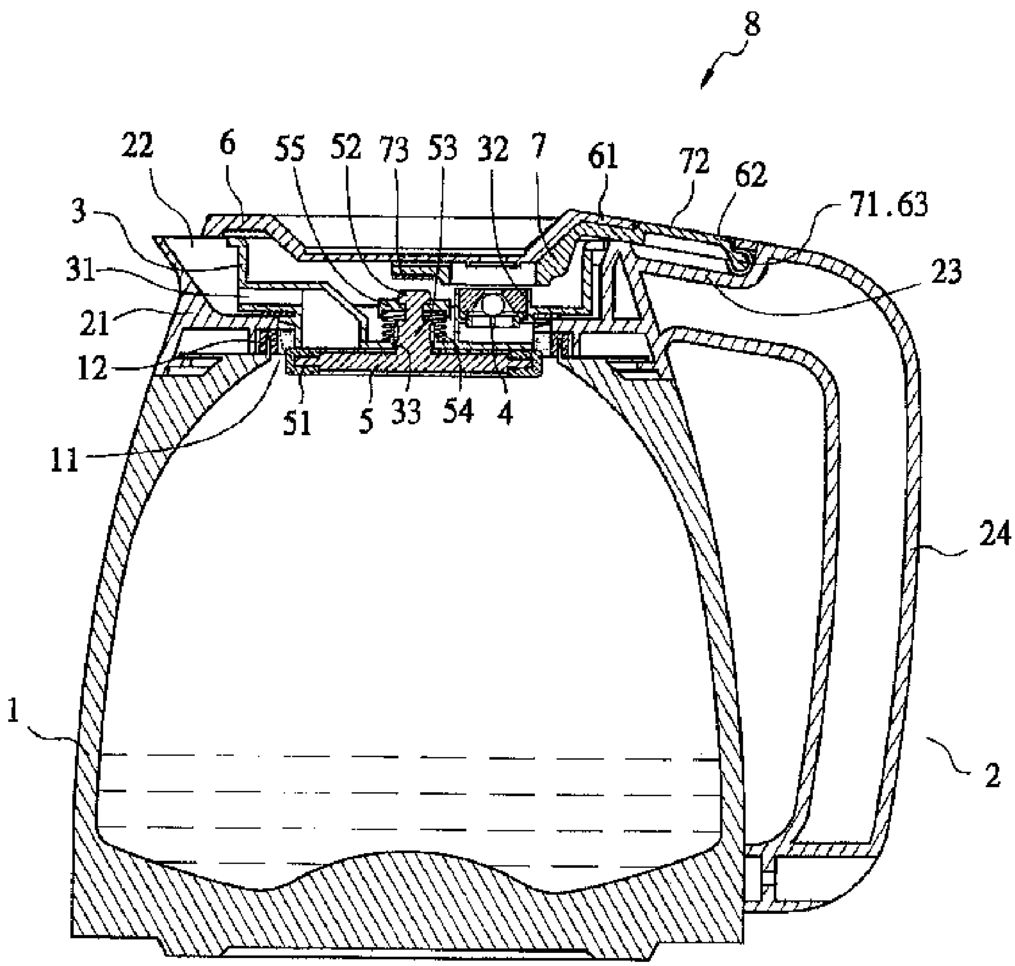
FIG. 2 is a sectional view of the assembled coffee maker where the coffee discharge passageway is closed in a non-operating position.
Figure 3:
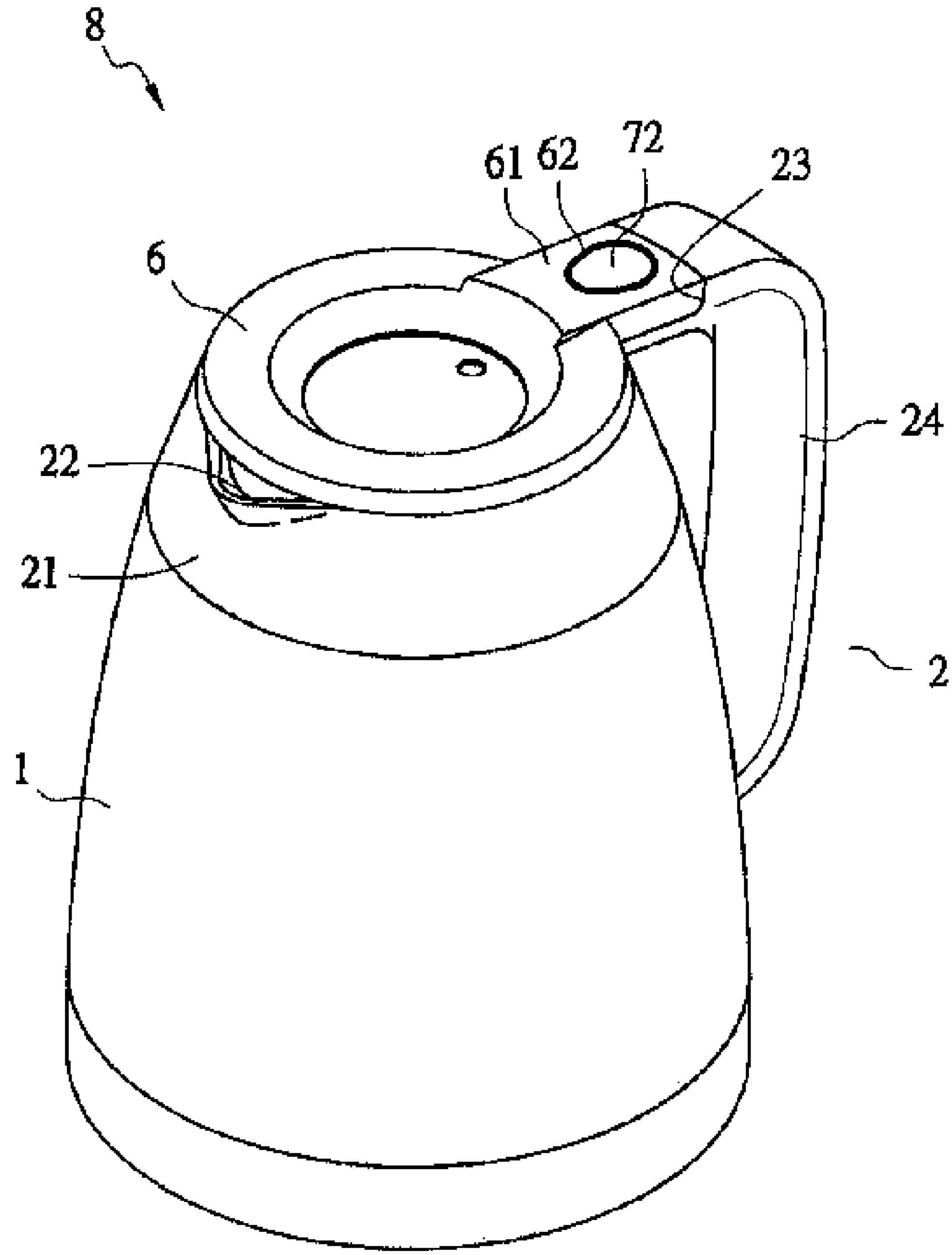
FIG. 3 is a perspective view of the coffee maker shown in FIG. 2.

Referring to FIGS. 1, 2 and 3, there is shown a coffee maker 8 constructed in accordance with a preferred embodiment of the invention. The coffee maker 8 comprises a liquid container 1 including an upper opening 11 and an O-ring 12 tightly put on an upwardly extending flange of the opening 11. A handle assembly 2 includes an annular seat 21 conformed to a top of the container 1, a spout 22 extended outward from a periphery of the seat 21, and a handle member 24, with the handle member 24 having a recessed end 23 formed with the seat 21. An annular pan 3 is placed in the seat 21 and includes a discharge opening 31 at its bottom, a central opening 33, and a cylindrical cavity 32 between the central opening 33 and an upwardly extending edge. A check valve 4 is mounted in the cavity 32. A discharge control assembly 5 includes a disk having a central post 53 and an enlargement 52 above the post 53 and connected thereto by a connecting member. A watertight ring 51 is put on the disk, and a washer 55 is put on the connecting member. A spring 54 is put on both the connecting member and the enlargement 52 and biased between the washer 55 and the pan 3. An annular lid assembly 6 is fitted on a top of the seat 21 above the pan 3 and includes a rear rectangular connecting element 61 conformed to the recessed end 23. The connecting element 61 has an opening 62 and two inner apertures 63 on two sides of the connecting element 61. An elongate actuation assembly 7 includes a rear lateral pin 71 having both ends pivotably fitted in the apertures 63 in order to form a hinge connection with the lid assembly 6, a push button 72 projected from the opening 62, and an actuation member 73 at the front end above the enlargement 52.

Figure 4:
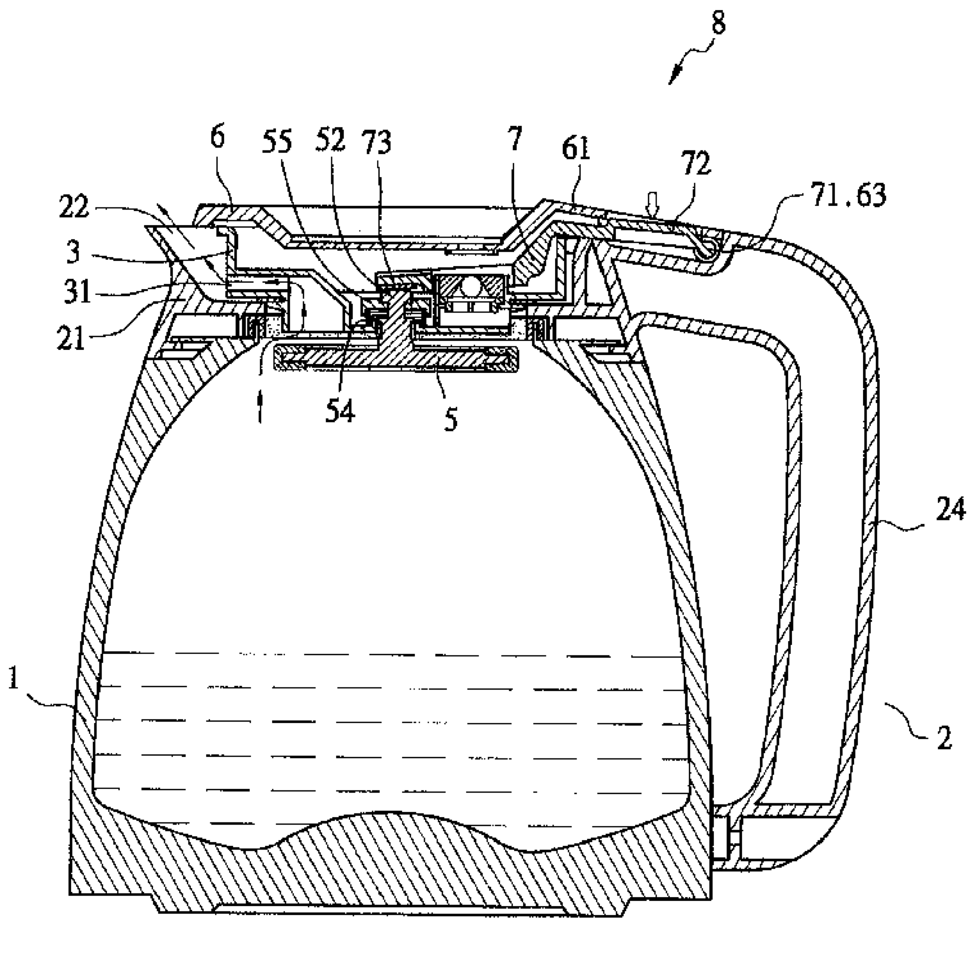
FIG. 4 is a view similar to FIG. 2 where the push button is pressed to open the coffee discharge passageway.

Referring to FIG. 4, an operation of the invention will now be described in detail below. For pouring coffee, simply press the push button 72, and the actuation member 73 thus lowers to press the enlargement 52 by pivoting about the pin 71. The spring 54 is compressed by the washer 55 due to the lowering of the enlargement 52. The disk of the discharge control assembly 5 also lowers due to the lowering of the enlargement 52. At that moment, an annular gap is formed between the disk of the discharge control assembly 5 and the opening 11. Thus, a coffee discharge passageway (as indicated by arrows) from the gap to the spout 22 through the discharge opening 31 is formed. As a result, coffee is able to flow out of the spout 22 via the coffee discharge passageway by tilting the coffee maker.

Referring to FIG. 2 again, releasing the push button 72 will cause the spring 54 to expand to return to its normal state with the post 53 being lifted. Also, the disk of the discharge control assembly 5 lifts to urge against bottom of the pan 3. As a result, both the gap and the coffee discharge passageway are closed.

While the invention herein disclosed has been described by means of specific embodiments, numerous modifications and variations could be made thereto by those skilled in the art without departing from the scope and spirit of the invention set forth in the claims.

What is claimed is:

1. A coffee maker comprising:

a liquid container including an upper first opening and an O-ring tightly fitted around the upper first opening;

a handle assembly including an annular seat placed on the container, a spout extended outward from a periphery of the annular seat, and a handle member, with the handle member having a recessed end formed with and extended outward from the annular seat;

a pan placed in the annular seat and including a discharge opening, a central second opening, and a cylindrical cavity;

a discharge control assembly including a disk having a central post, with the central post being barbell shaped and including a top end, with the discharge control assembly further including a spring on the central post and biased between the top end of the central post and the pan;

a lid assembly fitted on the seat above the pan and including a rear connecting member extended outward from the annular seat and conformed to the recessed end, with the connecting member having a third opening and a rear portion, with the third opening located intermediate the rear portion and the annular seat;

an elongate actuation assembly having a rear hingedly connected to the rear portion of the connecting member, with the third opening located intermediate the rear portion and the annular seat, with the elongate actuator assembly located intermediate the pan and the lid assembly, with the rear portion of the connecting member overlying the elongate actuation member, with the elongate actuator assembly including a push button projected from the third opening and a forward actuation member above the top end of the central post, with the push button located intermediate the rear of the elongate actuator assembly and the forward actuation member; and a check valve mounted in the cylindrical cavity;

whereby:

pressing the push button downward will lower the actuation member to press down the central post and the disk with the spring being compressed to form a gap between the disk and the pan and to create a coffee discharge passageway from the gap to the spout through the discharge opening; and releasing the push button will expand the spring to lift the post and the disk for closing the gap and the coffee discharge passageway.

* * * * *